(12) United States Patent
Maes et al.

(10) Patent No.: US 7,306,750 B2
(45) Date of Patent: Dec. 11, 2007

(54) CARBOXYLATE SALTS IN HEAT-STORAGE APPLICATIONS

(75) Inventors: Jean-Pierre Maes, Merelbeke (BE); Serge Lievens, Merelbeke (BE); Peter Roose, Sint-Martens-Latem (BE)

(73) Assignee: Texaco Inc., San Ramon, CA (US)

( * ) Notice: Subject to any disclaimer, the term of this patent is extended or adjusted under 35 U.S.C. 154(b) by 0 days.

(21) Appl. No.: 10/296,826

(22) PCT Filed: May 17, 2001

(86) PCT No.: PCT/EP01/05623

§ 371 (c)(1),
(2), (4) Date: Mar. 22, 2004

(87) PCT Pub. No.: WO01/90273

PCT Pub. Date: Nov. 29, 2001

(65) Prior Publication Data

US 2005/0139802 A1    Jun. 30, 2005

(30) Foreign Application Priority Data

May 24, 2000  (EP) .................................. 00304376

(51) Int. Cl.
*C09K 5/06* (2006.01)
*C09K 5/00* (2006.01)

(52) U.S. Cl. ............................. 252/73; 252/70; 252/71; 252/74; 252/75; 252/76; 252/77; 252/78.1; 252/79; 165/104.11; 165/104.12; 165/104.13; 165/104.15; 165/104.17; 165/104.19; 165/104.21

(58) Field of Classification Search .................. 252/70, 252/71, 73, 74, 75, 76, 77, 78.1, 79; 165/104.11, 165/104.12, 104.13, 104.15, 104.17, 104.19, 165/104.21
See application file for complete search history.

(56) References Cited

U.S. PATENT DOCUMENTS 4,109,702 A * 8/1978 Greene ........................ 165/10
4,400,287 A * 8/1983 Kimura et al. ................. 252/70

FOREIGN PATENT DOCUMENTS

EP        000739966 A1 * 10/1996
JP        53-14173 A   *  2/1978

* cited by examiner

*Primary Examiner*—Anthony J. Green
(74) *Attorney, Agent, or Firm*—Steven R. Ellinwood

(57) ABSTRACT

The application of carboxylate salts for storing thermal energy is disclosed. The invention is directed to methods for the storage and use of thermal energy comprising contacting mixtures of alkali metal salts or alkali earth metal salts of carboxylic acids, storing the thermal energy in the mixture, containing the mixture in a suitable heat exchange system and using the stored thermal energy in the heat exchange system.

9 Claims, 17 Drawing Sheets

SUCCESSIVE HEATING AND COOLING CURVES

TEMPERATURE DIFFERENTIAL VERSUS TIME

DIFFERENTIAL SCANNING CALORIMETRIC CURVES

DIFFERENTIAL SCANNING CALORIMETRIC CURVES

DIFFERENTIAL SCANNING CALORIMETRIC CURVES

DIFFERENTIAL SCANNING CALORIMETRIC CURVES

DIFFERENTIAL SCANNING CALORIMETRIC CURVES

TEMPERATURE DIFFERENTIAL VERSUS TIME

SUCCESSIVE HEATING AND COOLING CURVES

DIFFERENTIAL SCANNING CALORIMETRIC CURVE
EFFECT OF ADDITION OF K-HEPTANOATE

CARBOXYLATE SALTS IN HEAT-STORAGE APPLICATIONS

FIELD OF THE INVENTION

This invention relates to the application of carboxylate salts for storing thermal energy. Melted salts are used for heat-storage because salts absorb heat during the transition from the solid to the liquid phase. This heat is stored in latent form as long as the liquid state persists and released again during the transition from the liquid to the solid phase when the liquid salt solidifies.

BACKGROUND OF THE INVENTION

Thermal energy originating from any energy source is reusable if it can be stored. Examples of reusable energy are excess heat from stationary and automotive internal combustion engines, heat generated by electrical motors and generators, process heat arid condensation heat (e.g. in refineries and steam generation plants). Energy generated in peak load time can be managed and stored for later use. Examples are solar heating and electrical heating on low tariff hours.

The problem of cold car engine start in wintertime is well known. Frost and damp on windscreen and windows, difficult engine start, cold in the passenger compartment. Car manufacturers are aware of this problem and make every possible effort to improve the driver's comfort under such circumstances. Electrical heating of windshield, rear windows, steering wheel and passenger seats are offered as comfort options. However these solutions put an extra burden on the vehicle's electrical power system. Engine manufacturers are looking for solutions that make preferably use of excess heat generated by the engine that can be controllably released to the environment. Heat-storage salts or functional fluids containing heat-storage salts may find new applications in emerging technologies. Heat-storage salts could for instance be applied to maintain fuel cells at constant temperatures.

An aspect of this invention is that in automotive and heavy-duty engine applications, excess engine heat can be stored in carboxylic salts or in carboxylic salt solutions integrated into the engine heat-exchange system. The stored heat can be used to rapidly heat critical engine components, engine fluids and gas catalyst. Heating of these critical components before engine start helps avoids the discomfort, high fuel consumption, high exhaust emissions and increased engine wear linked to cold engine start. The heat stored in carboxylic salts or in carboxylic salts solutions can also be used to heat the passenger compartment to improve driver and passenger comfort in cold climates.

PRIOR ART

Hydrated fluoride-, chloride-, sulfate- and nitrate salts or salt combinations have been described as heat-storage media. U.S. Pat. No. 4,104,185 describes a heat accumulator in which the heat-energy storage medium consists essentially of a potassium fluoride/water solution having a fluoride content between 44 and 48% by weight. U.S. Pat. No. 5,567,346 relates to a latent heat storage material composition comprising 65 to 85 wt % of sodium sulfate decahydrate, 1 to 20 wt % of ammonium chloride and 1 to 20 wt % of sodium bromide, and optionally 1 to 20 wt % of ammonium sulfate. U.S. Pat. No. 5,728,316 relates to heat-storage salt mixtures composed of magnesium nitrate hexahydrate and lithium nitrate in mass ratio 86-81:14-19. U.S. Pat. No. 5,755,988 relates to a process for moderating the thermal energy content of closed container comprising mixtures of organic acids.

Co-assigned EP 0,229,440, EP 0,251,480, EP 0,308,037 and EP 0,564,721 describe the use of carboxylate salts as corrosion inhibitors in aqueous heat exchange fluids or corrosion-inhibited antifreeze formulations. EPA No. 99930566.1 describes aqueous solutions of carboxylates that provide frost and corrosion protection. Aqueous solutions of low carbon ($C_1$-$C_2$) carboxylic acid salts, in combination with higher carbon ($C_3$-$C_5$) carboxylic acid salts, were found to provide eutectic freezing protection. Improved corrosion protection was found by adding one or more than one $C_6$-$C_{16}$ carboxylic acids. The advantage of these carboxylic salts based cooling fluids over ethylene glycol- or propylene glycol cooling fluids is improved heat-transfer due to a higher specific heat and improved fluidity resulting from the higher water content at the same frost protection. It is another objective of this invention to add heat-storage capacity to the above heat-exchange fluids and other functional fluids and soaps like lubricants and greases.

It is an object of the present invention to provide heat storage salt combinations that are less toxic and less burdensome to the environment than the fluoride-, chloride-, sulfate- and nitrate salts or the acidic salt combinations used in prior art. Another object of the invention is to provide heat storage salt combinations that are less corrosive to the metals and materials used in heat transfer- and heat-storage equipment.

SUMMARY OF THE INVENTION

One aspect of the invention relates to the application of alkali metal salts or alkali earth metal salts of carboxylic acids, and combinations of such salts as latent heat-storage media. Therefore, one object of the invention is to use of one or a mixture of alkali metal earth salts or a brine-solution of $C_1$-$C_{18}$ carboxylic acids as a medium for the storage and use of thermal energy. A combination of a salt of one or more $C_1$-$C_2$ carboxylic acids and one or more $C_3$-$C_5$ carboxylic acids may also be used, as well as a combination of a salt of one or more $C_1$-$C_5$ acids and one or more $C_6$-$C_{18}$ carboxylic acids. In another embodiment the salts may be the salts of one or more $C_3$-$C_{18}$ carboxylic acids. The carboxylate heat-storage salts of this invention, which also may be anhydrous salts of one or more $C_3$-$C_5$ carboxylic acids and of one or more $C_6$-$C_{16}$ carboxylic acids, are less toxic and more environmentally friendly than the fluoride-, chloride-, sulfate- and nitrate salts or salt combinations used in prior art. They are also less corrosive to the metals and materials used in heat transfer- and heat-storage equipment. They are similar to the carboxylates used as corrosion inhibitors in aqueous and glycol based heat-exchange fluids. They are also compatible with the carboxylates (formates and/or acetates) used as freezing point depressant in aqueous heat-exchange fluids.

In heat storage applications it is important to find media with melting temperatures that are in line with the temperature operating range of the heat source and which have high latent heat capacity. It is another aspect of this invention that mixtures of carboxylic salts can be tuned to provide melting temperatures that fit the application temperatures. Similarly, combinations with high heat capacity can be selected to optimize storage capacity. This can be done by mixing different salts of the same carboxylate (for instance the potassium, lithium and/or sodium salt of the same carboxylate) or by mixing the salts of different carboxylates. Accordingly, temperatures of the thermal energy storage medium in any embodiment of the invention may range between about 20° C. to 180° C.

In heat storage applications it is also important that the heat storage salts can withstand unchanged and unlimited cycles of heat storage and heat release. Hydrated heat-storage salts are particularly susceptible. Loss of water from hydrolyzed crystals will introduce anhydrous crystalline structures with different melting temperatures and different latent heat capacities that may no longer be suitable for the application. Dehydration at temperatures above the melting temperature of a hydrated salt can be avoided by using hermetically sealed containers and limiting the free space where water can condense without contact with the heat-storage salts. These measures limit to some extent the use of hydrated salts in heat-storage applications. Accordingly, in another embodiment of the invention the heat storage salts are the hydrated salts or a brine solution of a $C_1$ carboxylic acid or, in yet another embodiment, one or more $C_3$-$C_7$ carboxylic acids.

It is another aspect of this invention to disperse carboxylate salts with heat-storage capacity in the heat-transfer fluid. Heat-storage salts can be selected that have limited solubility in the heat-transfer fluid of choice. The total amount of heat-storage salts added to the solution can be tuned to the heat capacity required in a particular system. As the melting temperature of the dispersed heat-storage salts is reached, the salts will start to melt and extract heat from the fluid by phase transmission. The fluid temperature can only rise again when all the heat-storage salts are in molten state. In the case where hydrated heat-storage salts are used, the use of an aqueous heat-exchange fluid in which the salts are dispersed ensures hydration.

Heat-storage salts can be selected that have densities that are close in solid and liquid phase so that there is no risk of damage to the container or system due to expansion upon phase transition. In many heat-exchange applications, however, a fluid phase will be preferred to allow easy transport of heat. Dual heat-exchange systems can of course be used, in which the primary system contains the heat-storage salts, and the secondary system contains the heat-transport fluid.

It is another aspect of the invention to improve the heat capacity of a heat-exchange fluid by dispersion of heat-storage particles in existing heat-exchange fluids or other functional fluids or soaps. Accordingly, this aspect of the invention provides a method for improving the heat-exchange properties and thermal capacity of a fluid or soap by dispersing within said fluid or soap any of the carboxylic salts disclosed above. Examples of such fluids or soaps are: (1) Heat-exchange fluids based on water soluble alcohol freezing point depressants such as ethylene glycol, propylene glycol, ethanol or methanol, (2) Heat-exchange fluids based on aqueous solutions of low carbon ($C_1$-$C_2$) carboxylic acid salts (formates, acetates) or mixtures thereof, (3) Heat-exchange fluids, lubricants or hydraulic fluids based on mineral- or synthetic oil, mineral and synthetic soaps or greases. In this embodiment of the invention, suspended particles provide heat-storage capacity in the bulk of the existing exchange medium, lubricant or grease.

The alkali metal salts of carboxylic acids have low toxicity, are biodegradable and are not corrosive towards many materials. An additional advantage of alkali metal carboxylates is that they are similar and/or compatible with the carboxylates used as freezing point depressant and with the carboxylates used as corrosion inhibitors in aqueous and glycol based heat-exchange fluids.

EXAMPLES

The invention will be more specifically described by way of reference to the following examples. A number of formulations were evaluated, by subjecting known quantities of salts to controlled heating and cooling cycles between 20° C. and 180° C.

| EXAMPLE | COMPOSITION |
|---|---|
| Comparative A | Magnesium Chloride Hexahydrate |
| Comparative B | Magnesium Nitrate Hexahydrate |
| Invention 1 | Potassium Octanoate |
| Invention 2 | Potassium Heptanoate |
| Invention 3 | Potassium Octanoate (90%)/Potassium Heptanoate (10%) |
| Invention 4 | Potassium Propionate |
| Invention 5 | Sodium Propionate (30%)/Potassium Formate (70%) |
| Invention 6 | Potassium Octanoate (70%)/Potassium Heptanoate (30%) |
| Invention 7 | Brine solution of 80 w/w % Potassium Propionate |
| Invention 8 | Sodium Propionate (20%)/Potassium Formate (20%)/Potassium Heptanoate (10%)/Water (50%) |

DISCLOSURE OF THE INVENTION

Application of Carboxylate Salts in Hear-Storage Applications

One aspect of the invention is that alkali metal salts and alkali earth metal salts of carboxylic acids have been found to have heat-storage capacities which allow these salts to be used in heat-storage applications. To evaluate the heat-storage capacities, salts were subjected to controlled heating and cooling cycles over a preset temperature range. For instance, to evaluate possible automotive applications, known quantities of the salts were subjected to controlled heating and cooling cycles between 20° C. and 180° C. When, upon heating, the melting point is reached, the temperature measured within the salt will tend to remain constant until all of the salt is melted. By measuring the temperature differential between salt and a reference recipient subjected to the same temperature cycles, the melting point can be determined. By integrating the temperature differential over time, the latent heat capacity of the sample can be measured. Similarly, when, upon cooling the solidification point is reached, the temperature measured within the salt will tend to remain constant until all of the salt is solidified. Again, by integrating the temperature differential over time, the latent heat capacity of the sample can be estimated (differential scanning calorimetric technique). By repeating the temperature cycles, the stability of the heat-storage salt can be evaluated.

Figure 1:
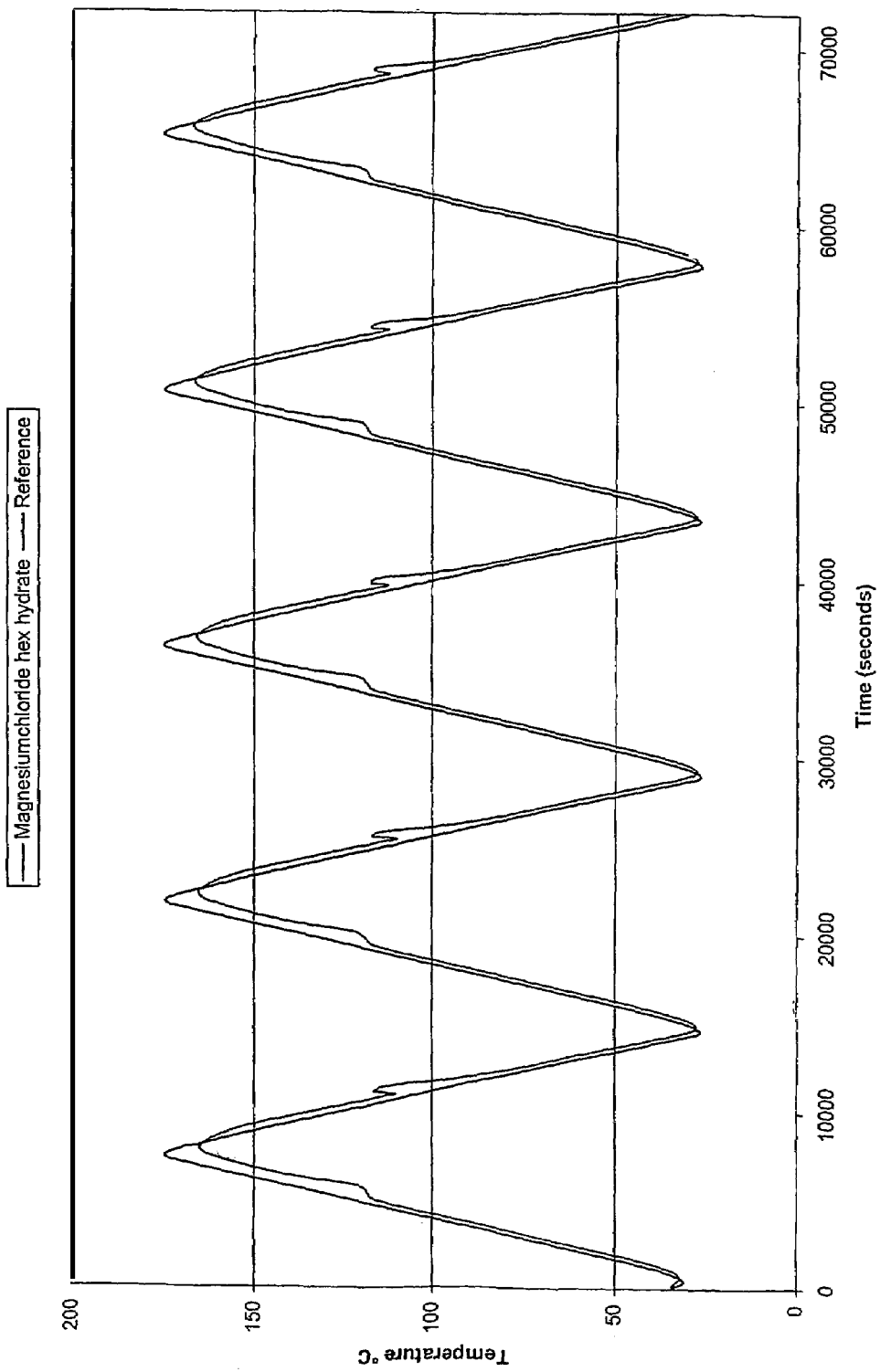
FIGS. 1-17 show heat transformation curves for the formulations of the examples. They are more specifically described hereinafter.
Figure 2:
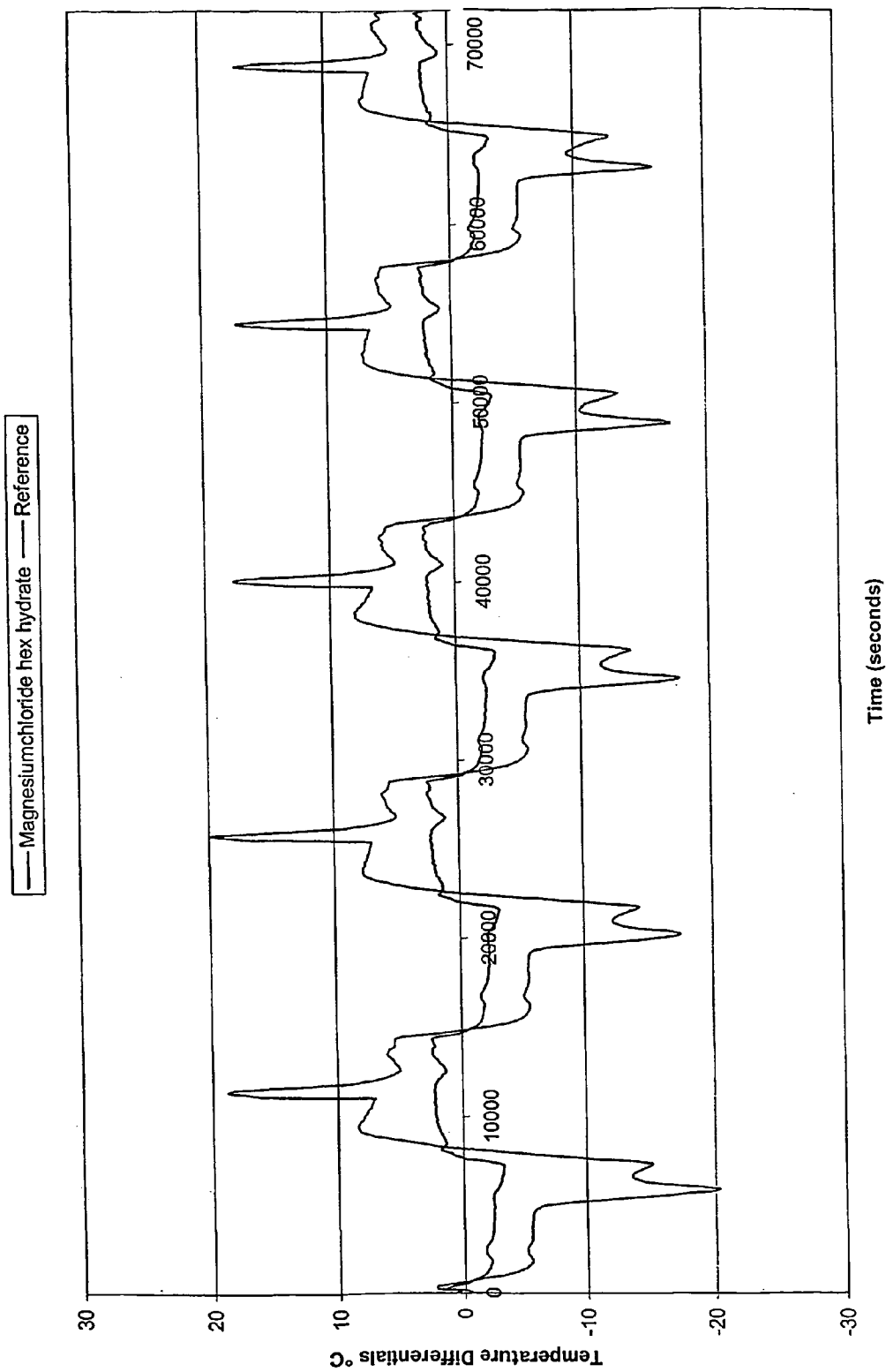
Figure 3:
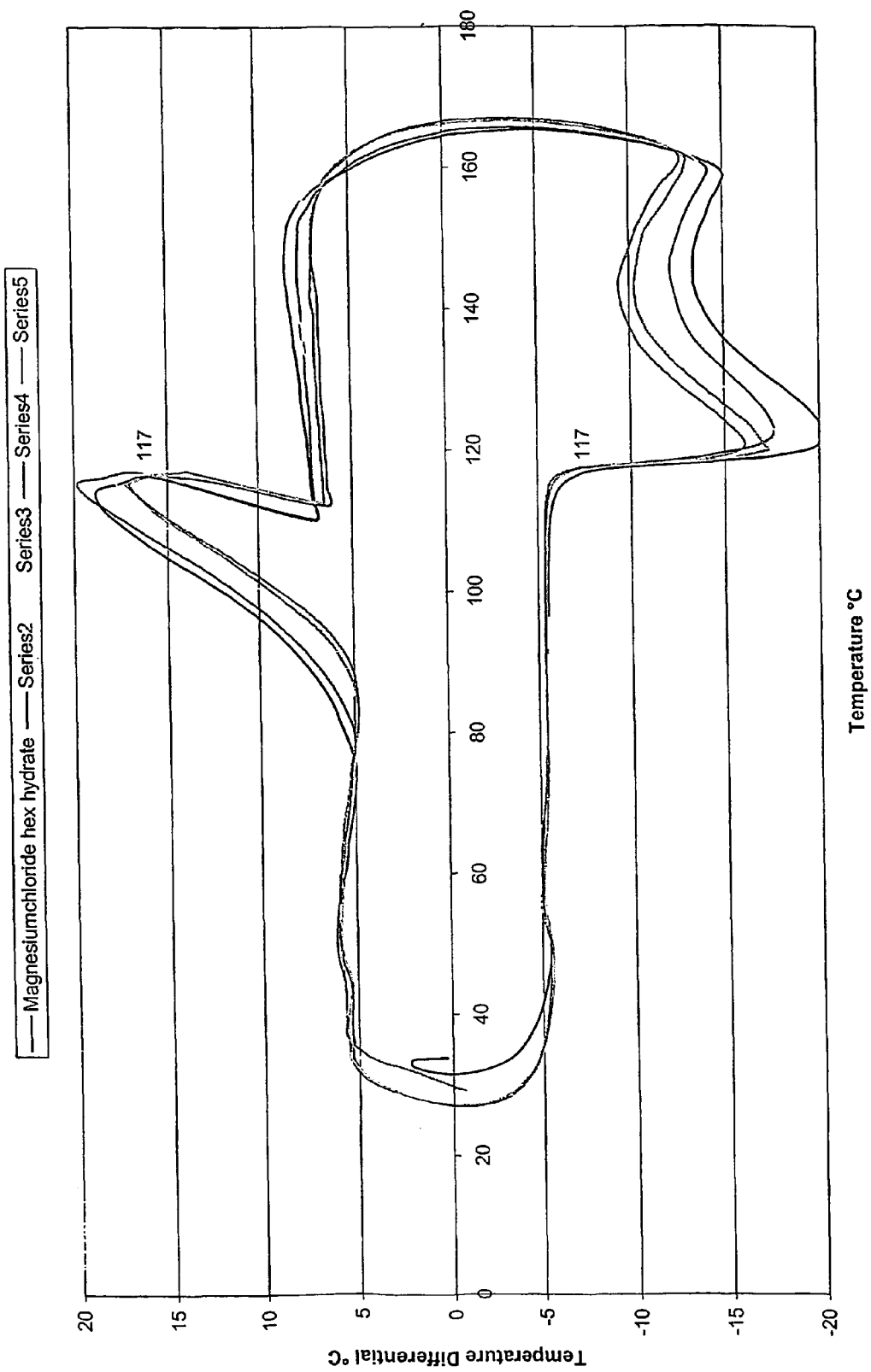
Figure 4:
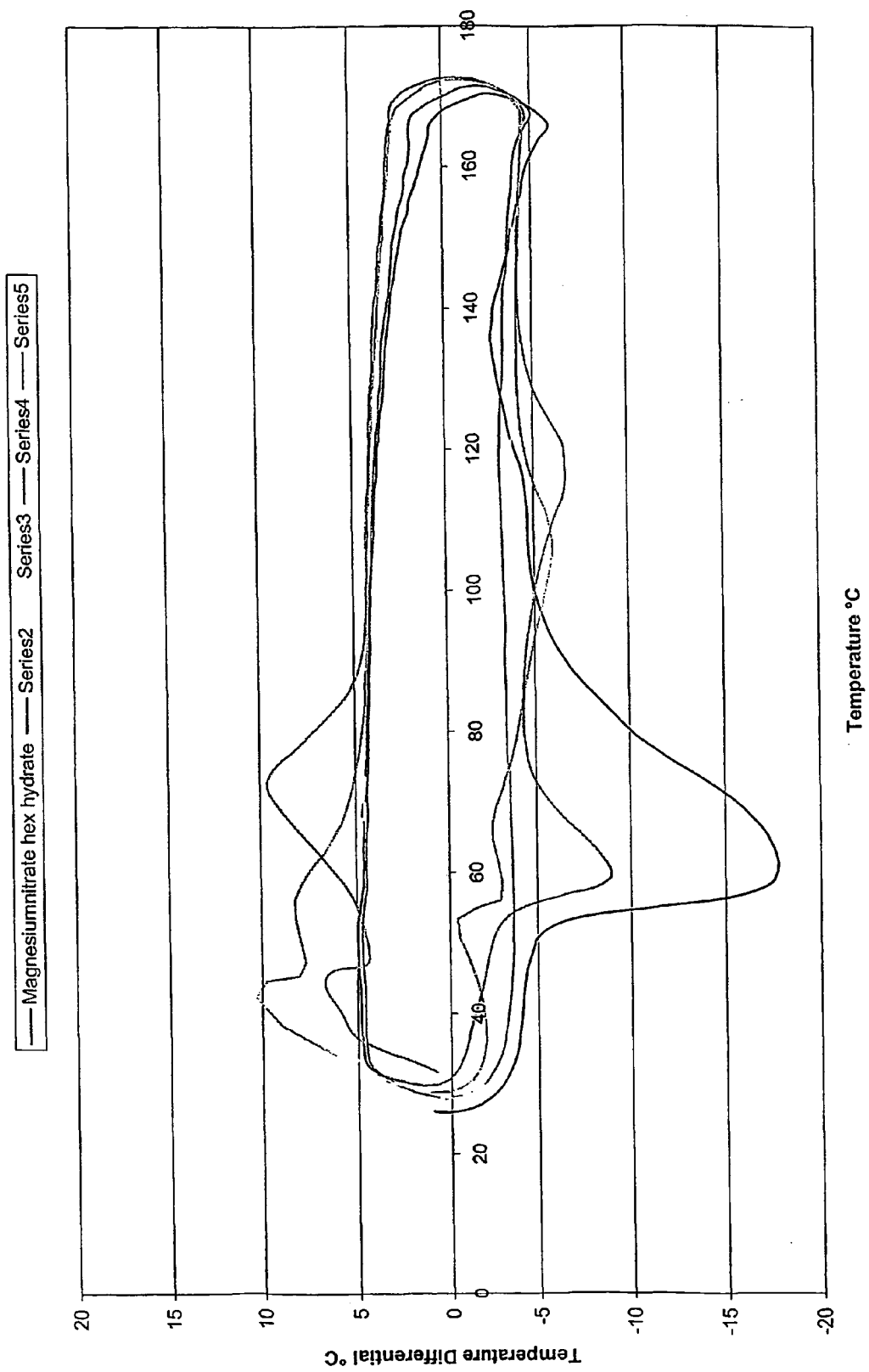
Figure 5:
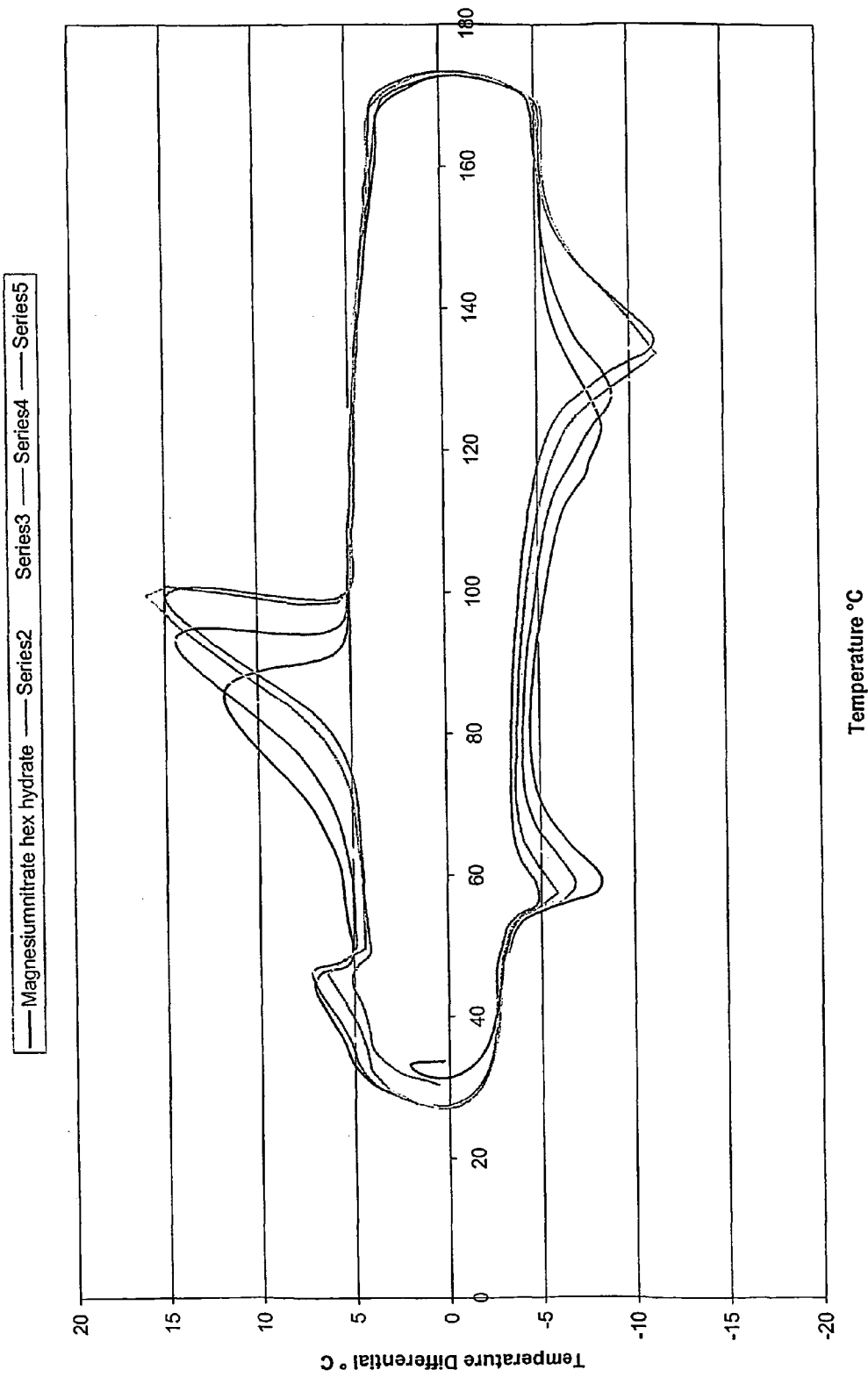

Literature provides information on the melting point and heat capacity of some known heat-storage salts. For instance, magnesium chloride hexahydrate (comparative example A) has been reported to have a melting point of 117° C. and a latent heat capacity of 165 KJ/kg. FIG. 1 shows experimental curves for magnesium chloride hexahydrate. The temperature cycle has been repeated five times. FIG. 2 shows the temperature differentials versus time. In FIG. 3, the temperature differentials axe plotted in function of temperature. From these curves it can be derived that the melting point is indeed 117° C. Under-cooling upon solidification is shown. Repeatability of the melting point in successive temperature cycles or series is good. Some reduction in heat capacity is however noted, likely the result of partial dehydration of the salt. More extreme shifts in melting point(s) and heat-storage capacity are shown in FIG. 4 for magnesium nitrate hexahydrate (comparative example B). In this experiment heat-storage capacity is lost in the second and third temperature cycle (series 2 and 3). Additional temperature cycles for the sample of magnesium nitrate hexahydrate are shown in FIG. 5. Dehydration of the salt apparently causes further changes and shifts in melting and solidification points towards higher temperatures.

Carboxylate Salts Provide Stable Heat-Storage Properties

Figure 6:
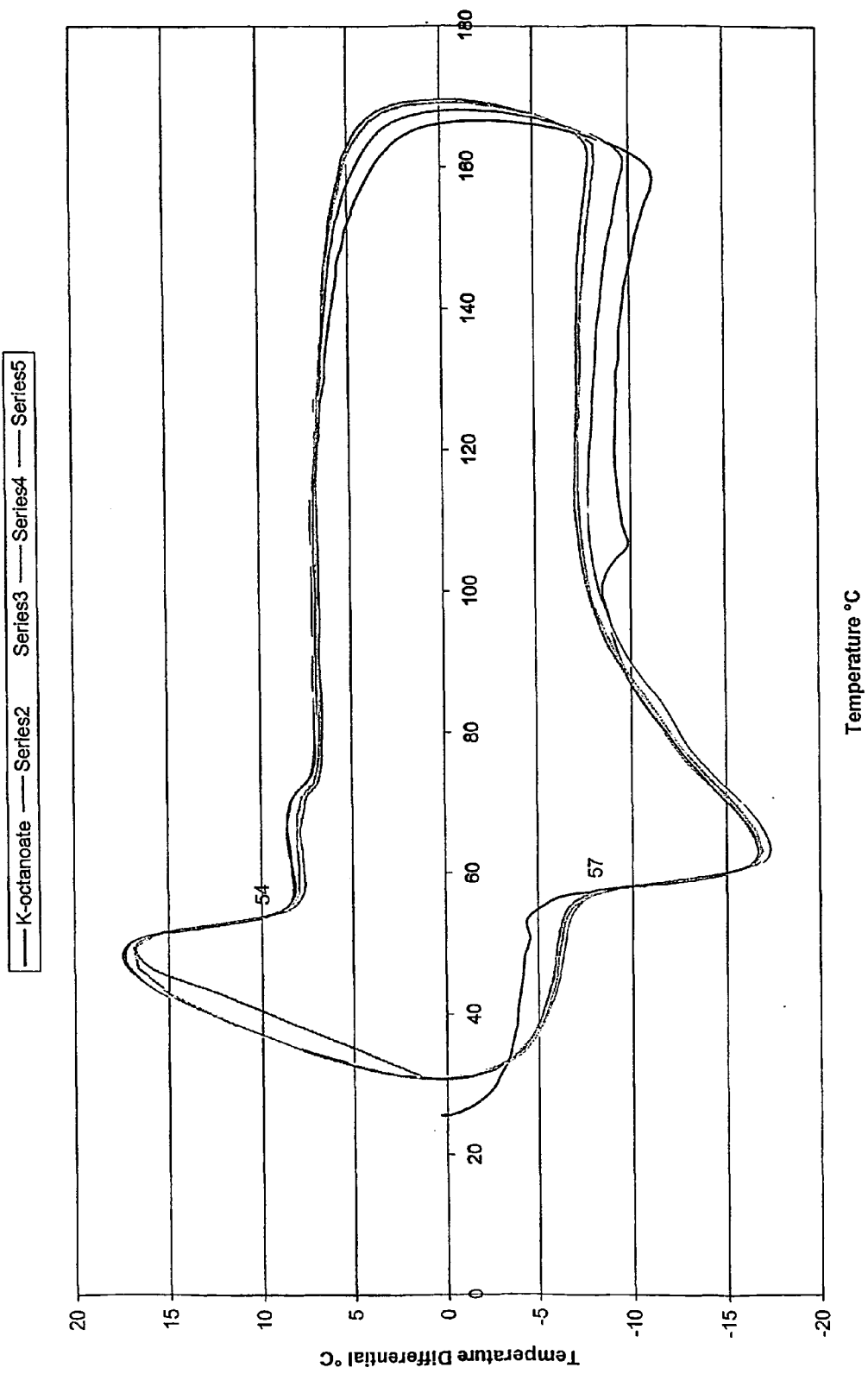
Figure 7:
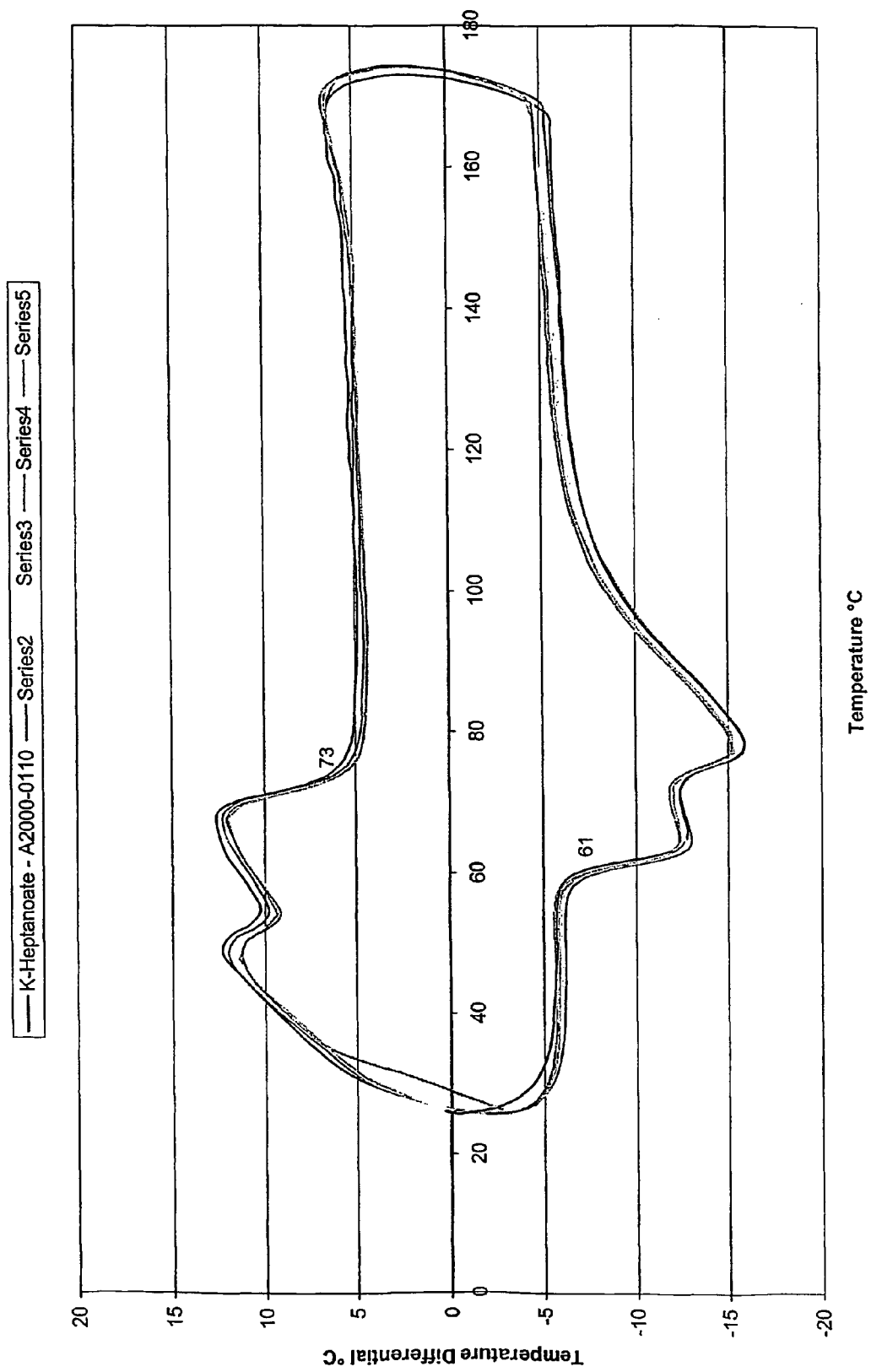

Surprisingly, a much more stable behavior is found for alkali metal salts of carboxylic acids that are also employed as corrosion inhibitors. For example, FIG. 6 shows five successive temperature cycles for potassium octanoate (invention example 1). The melting point of the salt is 57° C. An additional example using potassium heptanoate, is shown in FIG. 7 (invention example 2). The melting point for potassium heptanoate is 61° C.

Figure 8:
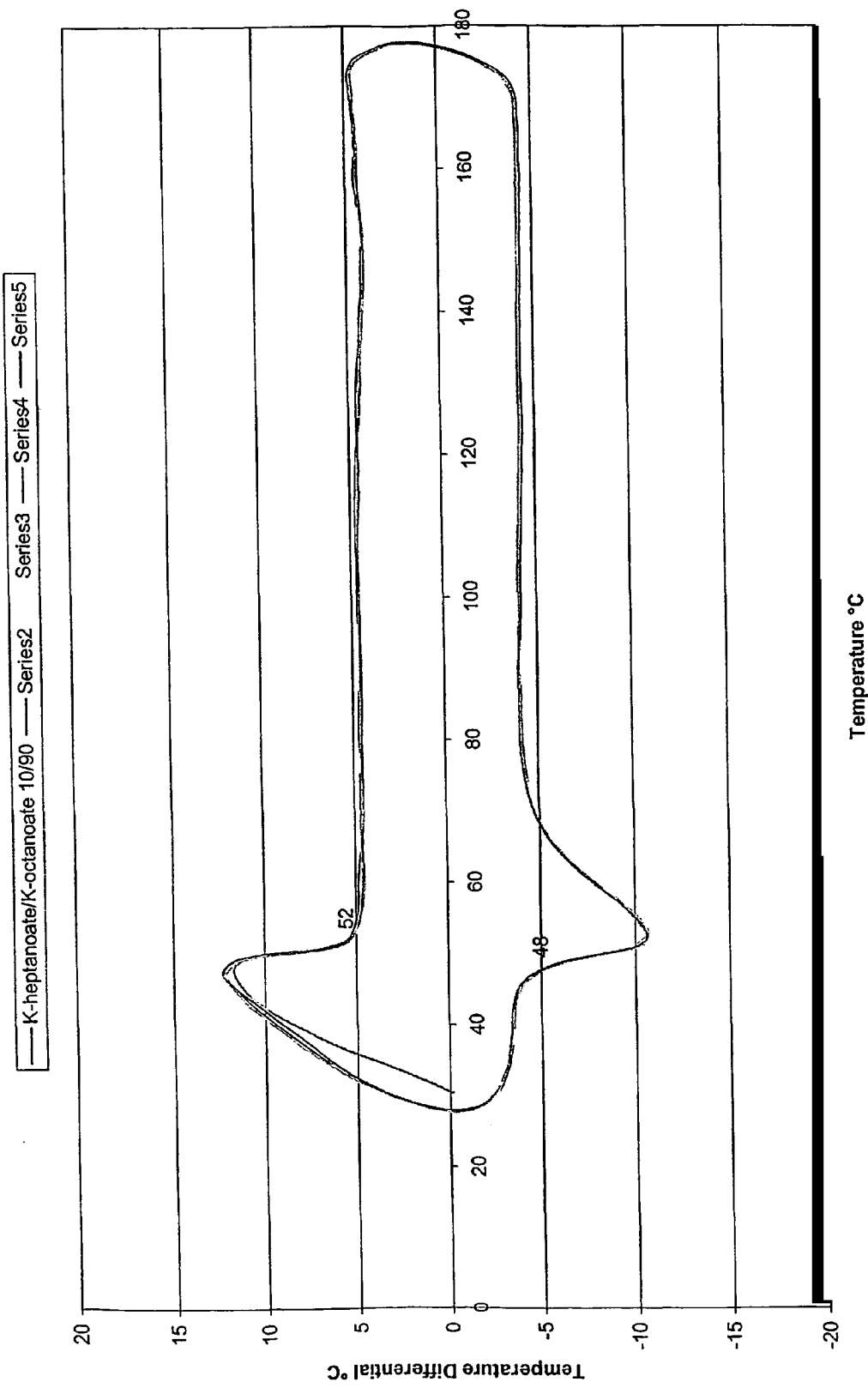
Figure 9:
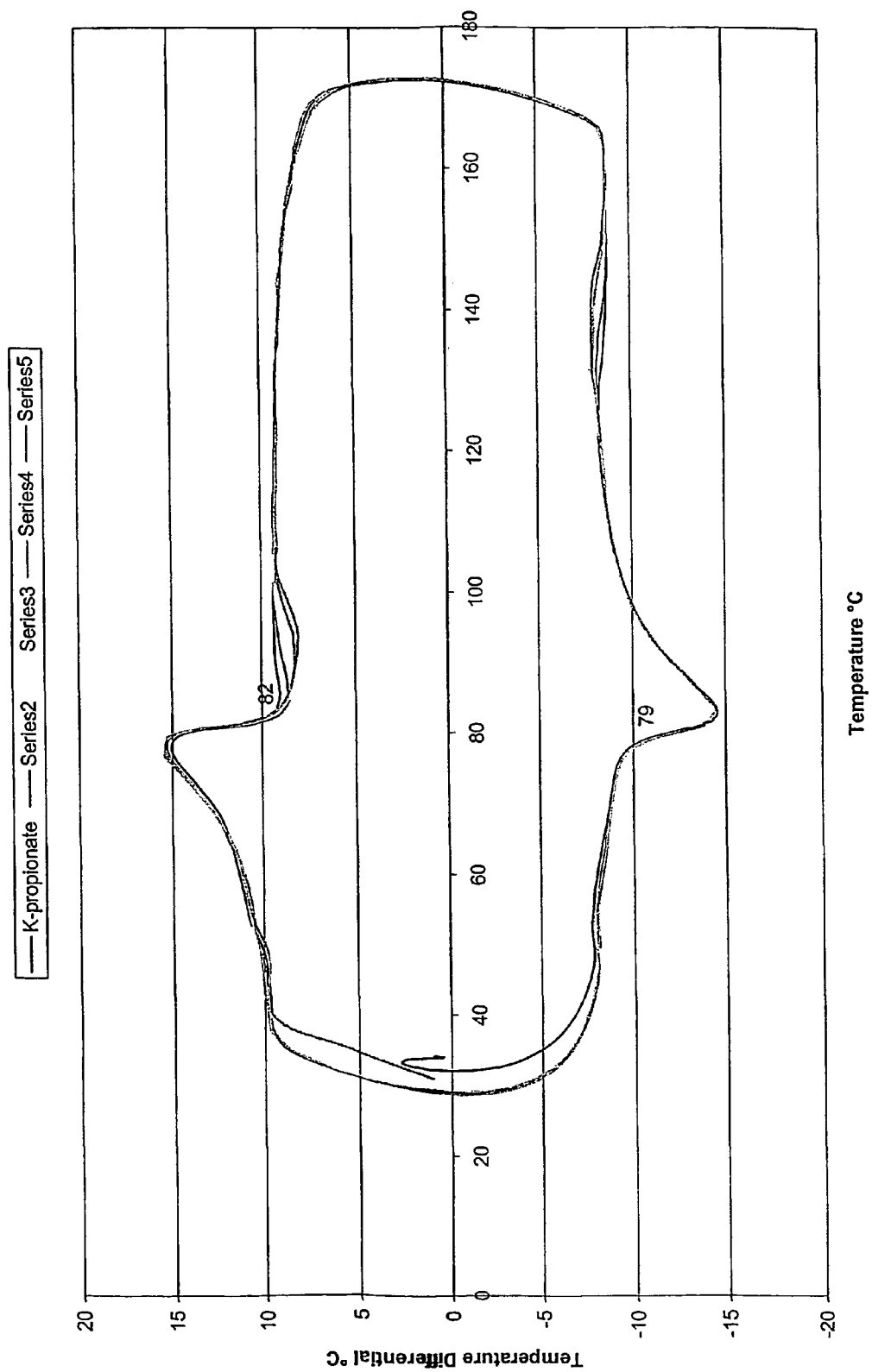
Figure 10:
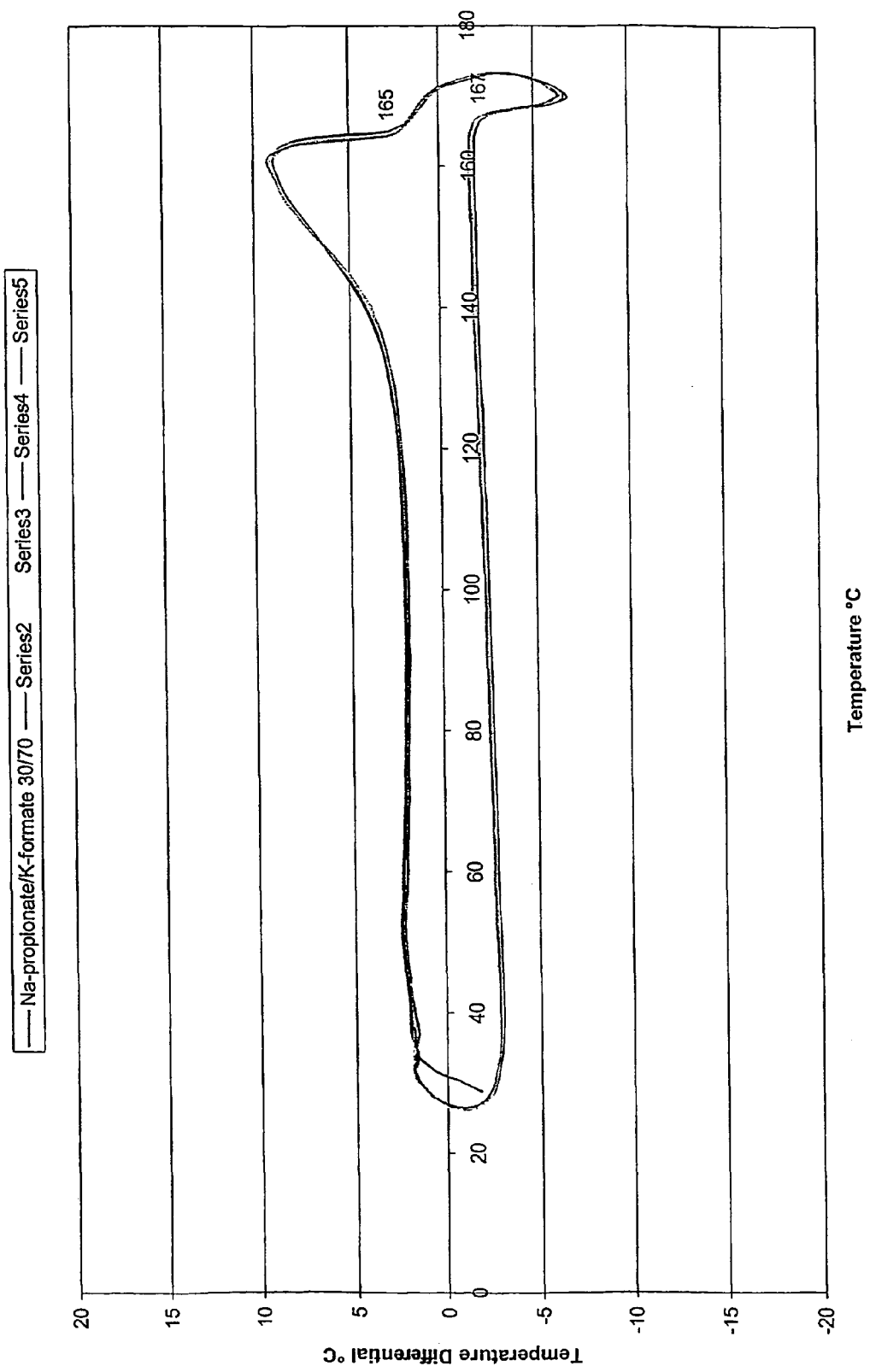

The Melting Point of Carboxylate Salts can be Tuned for a Specific Heat-Storage Application The melting point can be tuned for a specific application by the selection and mixing ratio of the alkali metal carboxylates. For example, a mixture of potassium octanoate (90%) and potassium heptanoate (10%) (invention example 3 shown in FIG. 8) was found to have a melting temperature of about 48° C., particularly suited for heat-storage at lower temperatures. In aqueous solutes these carboxylate salts or salt combinations show excellent corrosion protection properties. In addition, they are similar and thus fully compatible with the carboxylates used as corrosion inhibitors in ethylene glycol and propylene glycol heat-exchange fluids and water treatment chemicals. The low carbon ($C_1$-$C_2$) carboxylic acid alkali metal salts and the medium carbon ($C_3$-$C_5$) carboxylic acid alkali metal salts, or combinations of the two can be used as heat storage salts. For example, FIG. 9 (invention example 4) shows consecutive heating and cooling cycles for potassium propionate, with melting temperature of 79° C. A mixture of 30% sodium propionate and 70% potassium formate—FIG. 10 (invention example 5)—was found to have a melting temperature of 167° C.

Figure 11:
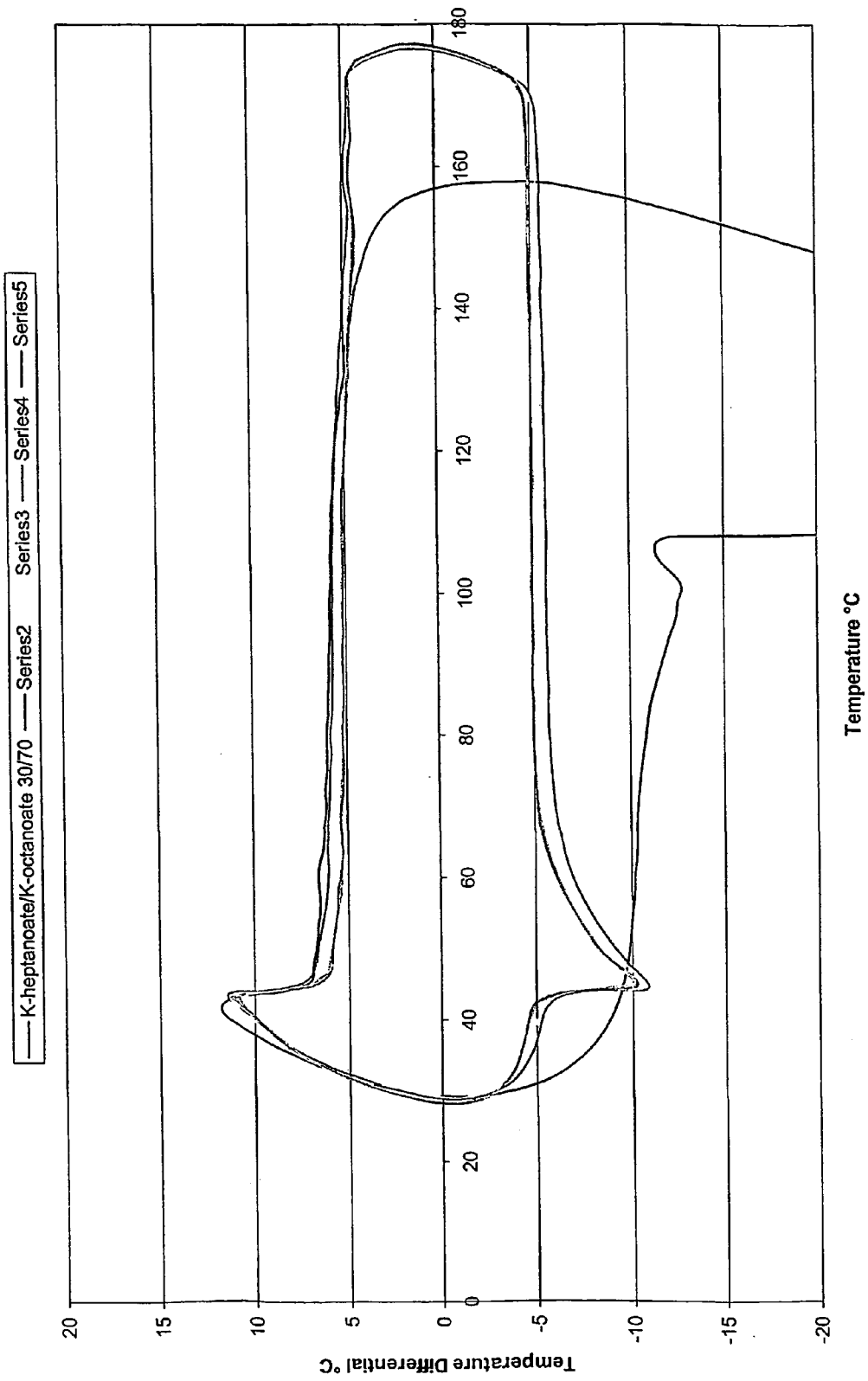

Heat-Storage Properties of Wetted or Hydrated Carboxylate Salts are Easily Restored It was found that, starting from hydrated or wetted carboxylate salts, stable heat-storage properties can easily be obtained by one or more temperature cycles in which the water is evaporated. This is illustrated in FIG. 11 (invention example 6) for a mixture of the potassium octanoate (70%) and potassium heptanoate (30%), with a melting temperature of about 42° C.—water is boiled off from a wet sample in the first heating cycle and latent heat can already be recovered in the first cooling cycle at a solidification temperature of about 45° C. This allows heat-exchange applications in which water is evaporated or added to the heat-storage salts, for instance to remove excess heat efficiently.

Brine Solutions of Carboxylate Salts have Heat-Storage Capacity

Figure 12:
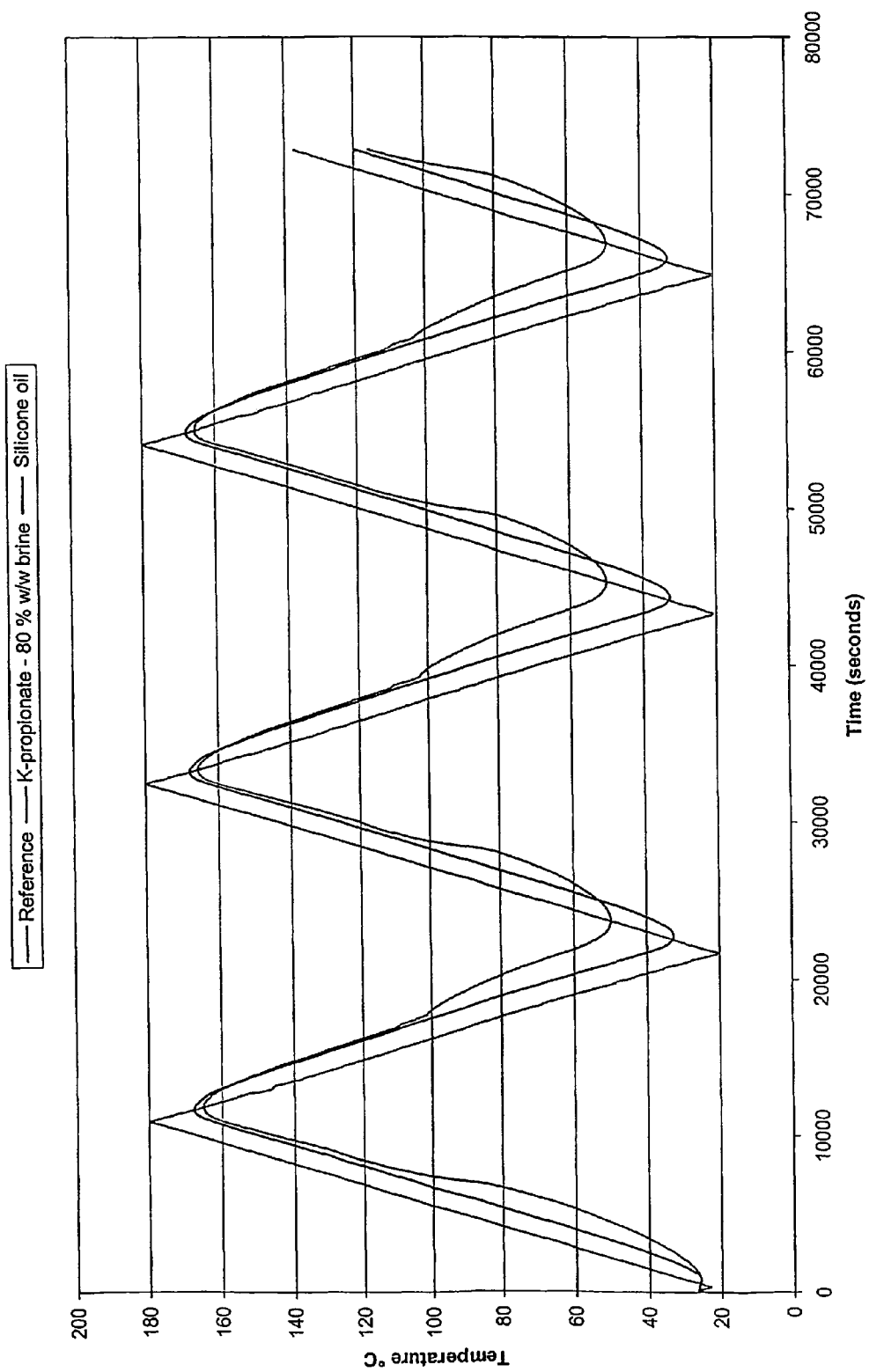
Figure 13:
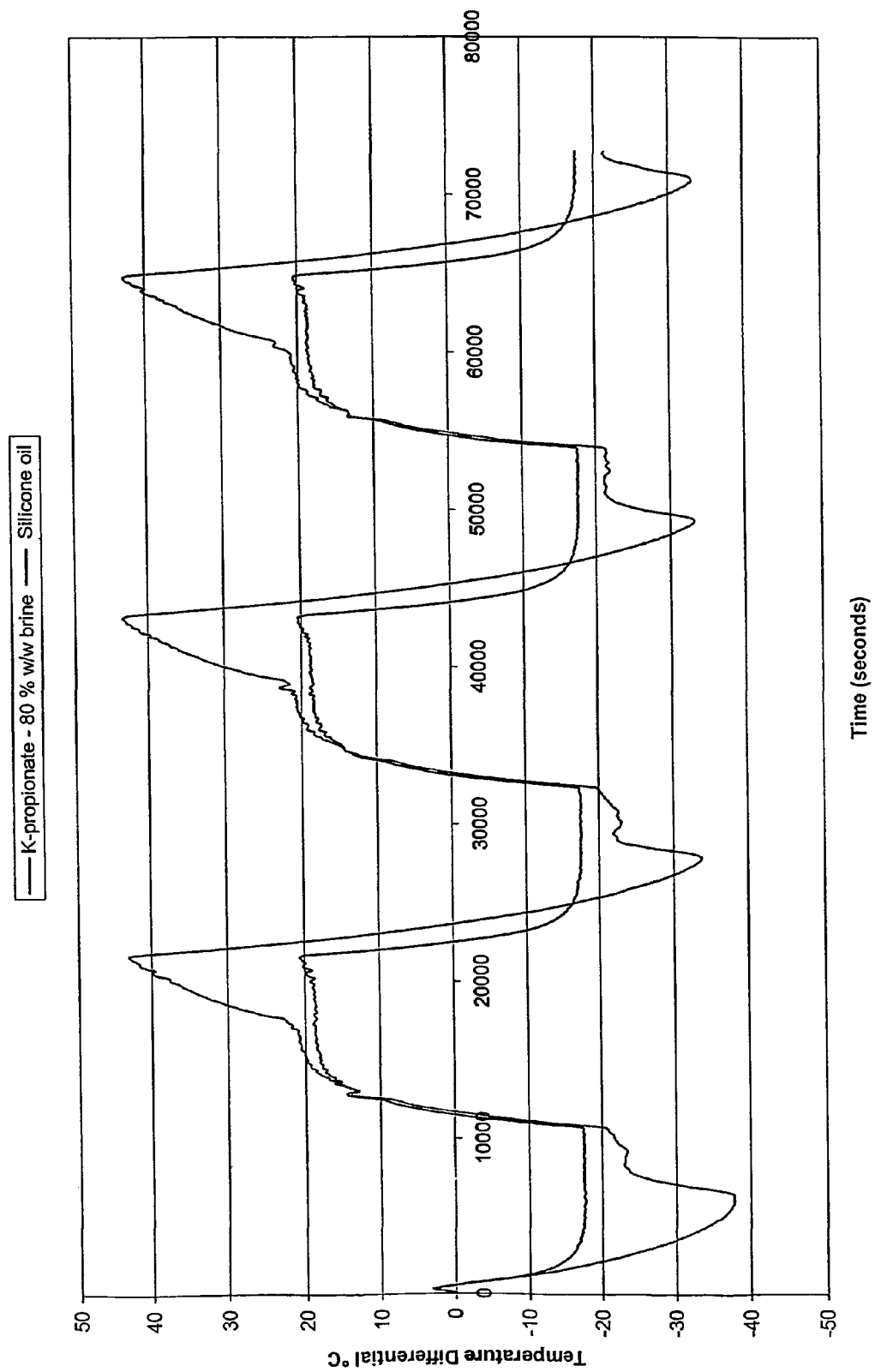
Figure 14:
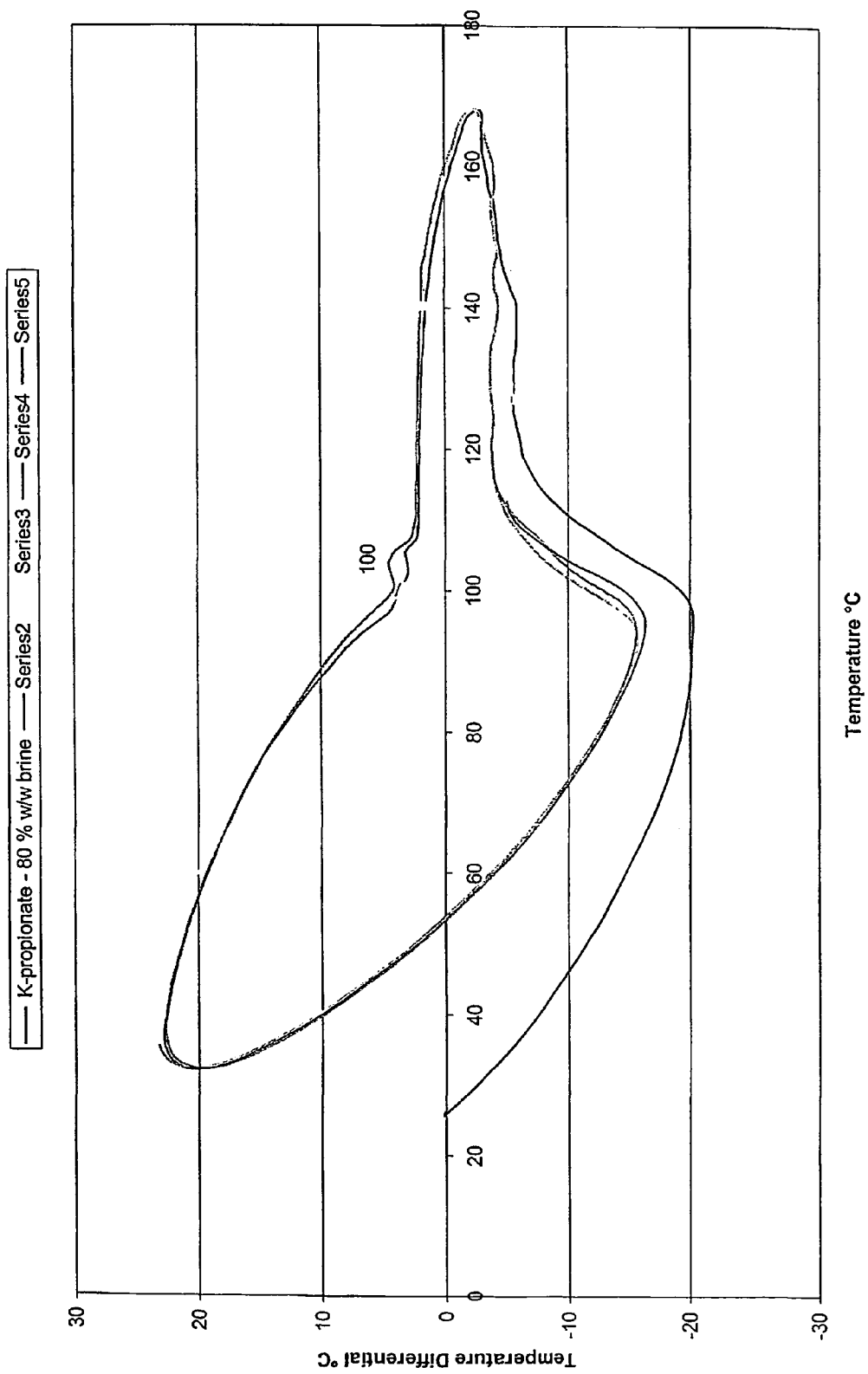

Brine solutions of carboxylate salts can also be used as heat-storage medium. For example, FIGS. 12 to 14 (invention example 7) shows the different curves for consecutive heating and cooling cycles for a brine solution of 80 w/w % of potassium propionate. Contrary to the salts, the aqueous brine solution was contained in a closed container, not allowing evaporation of water. In the experiment, phase transition on the lower temperature range was apparently not completed when the heating cycle was re-started, due to the high heat-storage capacity of the medium. Silicone oil was used as reference fluid.

Dispersed Carboxylates Salts Provide Heat-Storage Capacity to Fluids or Soaps

Figure 15:
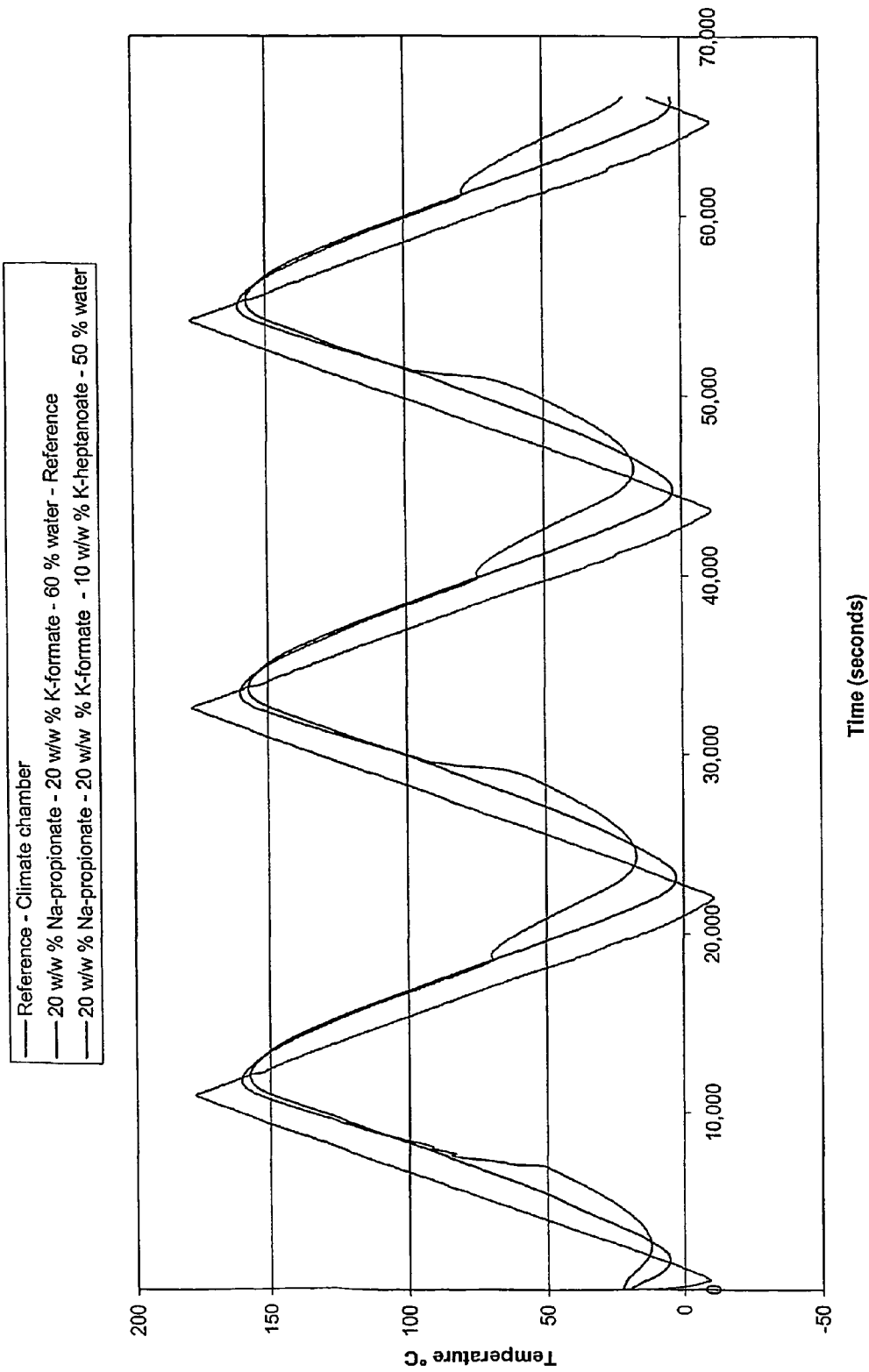
Figure 16:
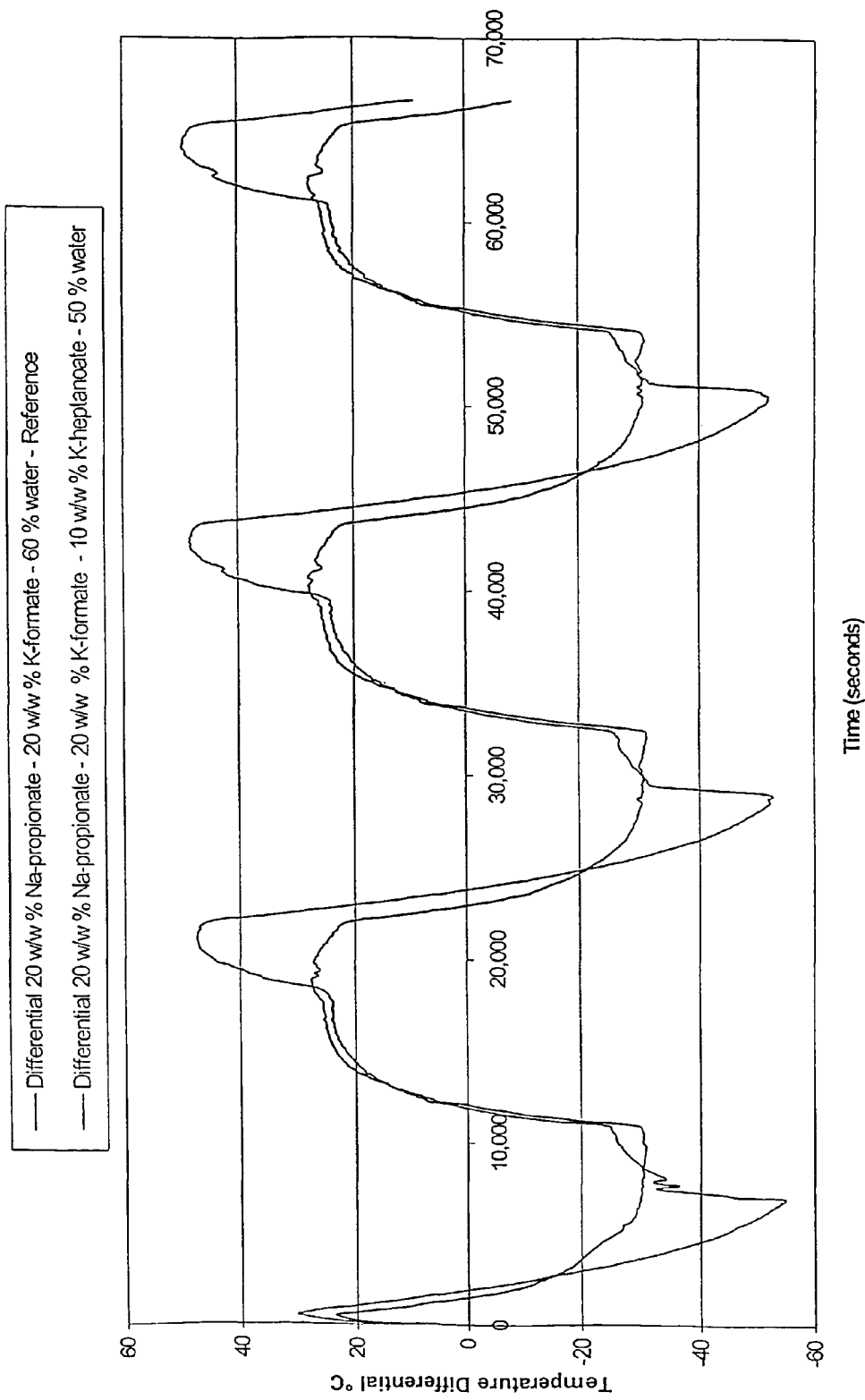
Figure 17:
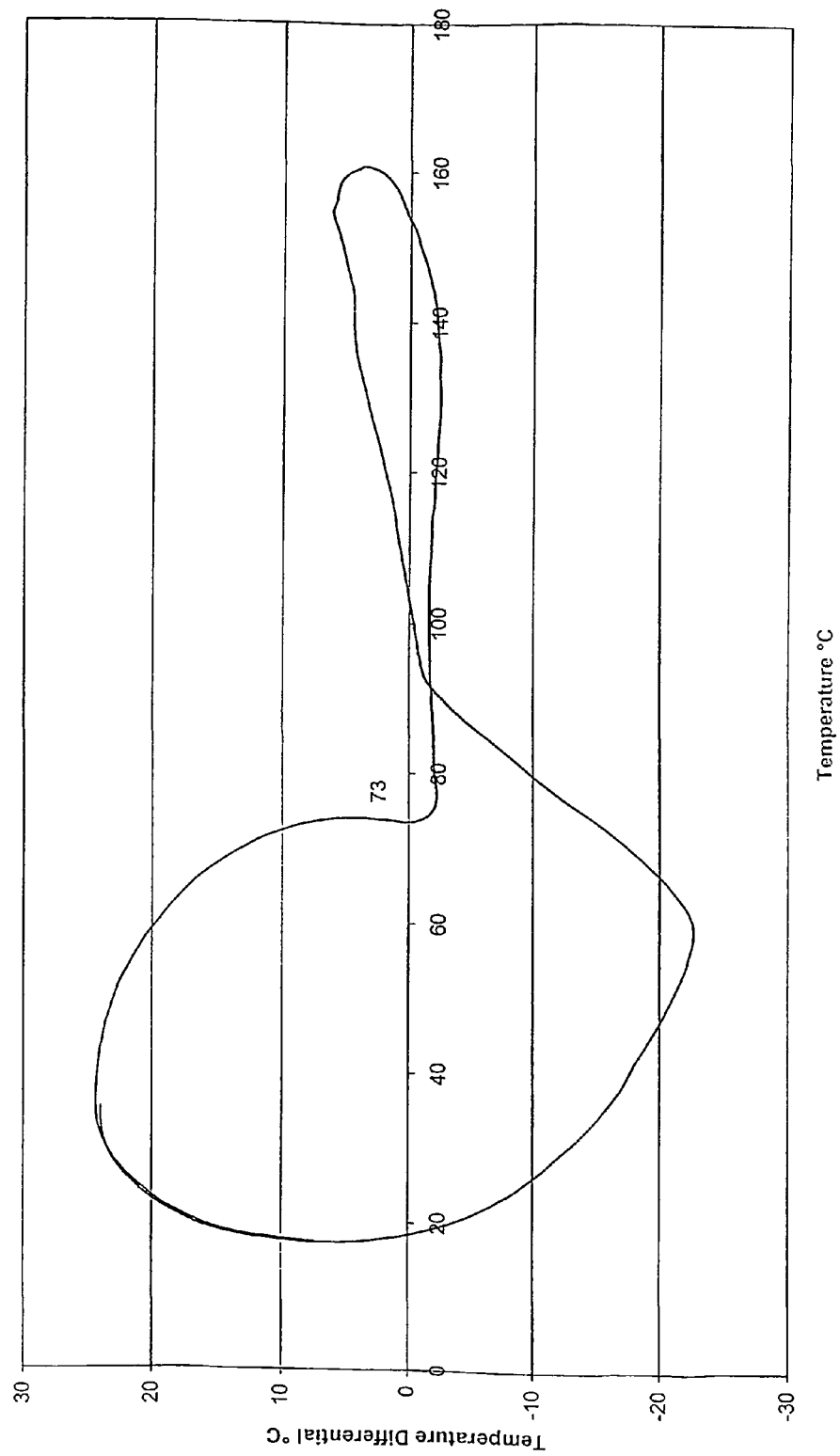

It is another aspect of this invention to disperse the hydrated salts with heat-storage capacity in the heat-transfer fluid. For example, FIG. 15 (invention example 8) shows the consecutive heating and cooling cycles for a mixture of 20% sodium propionate and 20% potassium formate and 10% potassium heptanoate with 50% water in comparison with a brine solution without the addition of the potassium heptanoate. The effect of the heptanoate additions is clearly seen. This is even more evident from the curves in FIG. 16, showing the differential temperatures in function of time. FIG. 17 shows the effect of the potassium heptanoate. The effect of solidification at about 73° C. which is also observed for pure potassium heptanoate (FIG. 7) is clearly seen. Dispersion of carboxylate heat-storage salts in other fluids will have similar effects. This will particularly be the case for glycol based heat-exchange fluids. Many carboxylate salts have limited solubility in glycol and water and can thus be dispersed in such fluids to add heat storage capacity. Similarly, this is possible in other functional products such as lubricants or hydraulic fluids based on mineral- or synthetic oil, and in mineral- and synthetic soaps or greases.

The invention claimed is:

1. A method for the use of one or a mixture of anhydrous salts, selected from the group consisting of the alkali metal salts, alkali earth metal salts, amine salts and ammonium salts of a $C_3$-$C_{18}$ carboxylic acid, for the storage and use of thermal energy comprising:
   (a) contacting said one or a mixture with a source of thermal energy for a sufficient time to absorb thermal energy;
   (b) storing said one or a mixture in a suitable heat exchange system;
   (c) releasing the thermal energy stored in said one or a mixture from said heat exchange system.

2. The method of claim 1 wherein said mixture comprises a salt of a $C_3$ carboxylic acid and a salt of one or more $C_4$-$C_5$ carboxylic acids.

3. The method of claim 1 wherein said mixture comprises a salt of one or more $C_3$-$C_5$ carboxylic acids and one or more $C_6$-$C_{18}$ carboxylic acids.

4. The method of claim 3 wherein said mixture comprises a salt of one or more $C_3$-$C_5$ carboxylic acids and one or more $C_6$-$C_{16}$ carboxylic acids.

5. The method of claim 1 wherein the temperature range of the thermal energy source is 20 to 180 degrees C.

6. The method of claim 1 wherein step (a) further comprises contacting one or a mixture of anhydrous salts, selected from the group consisting of the alkali metal salts, alkali metal earth salts, amine salts and ammonium salts of a $C_3$ carboxylic acid, with a source of thermal energy.

7. A method for improving the thermal properties of a fluid comprising: mixing said fluid with one or a mixture of anhydrous salts selected from the group consisting of the alkali metal salts, alkali earth metal salts, amine salts and ammonium salts of a $C_3$-$C_{18}$ carboxylic acid.

8. The method of claim 7 wherein the fluid is an alcohol freezing point depressant selected from the group consisting of ethylene glycol, propylene glycol, ethanol and methanol.

9. The method of claim 7 wherein the fluid is a lubricant or hydraulic fluid selected from the group consisting of mineral oil, synthetic oil, mineral soap, synthetic soap, mineral grease and synthetic grease.

* * * * *